(12) United States Patent
Rosson et al.

(10) Patent No.: US 10,067,299 B2
(45) Date of Patent: Sep. 4, 2018

(54) TUNABLE OPTICAL FIBER CONNECTORS AND CONNECTOR AND CABLE SUB-ASSEMBLIES AND ASSEMBLIES

(71) Applicant: Corning Optical Communications LLC, Hickory, NC (US)

(72) Inventors: Joel Christopher Rosson, Hickory, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/196,818

(22) Filed: Jun. 29, 2016

(65) Prior Publication Data
US 2018/0003902 A1    Jan. 4, 2018

(51) Int. Cl.
*G02B 6/36*    (2006.01)
*G02B 6/38*    (2006.01)

(52) U.S. Cl.
CPC .......... *G02B 6/3871* (2013.01); *G02B 6/387* (2013.01)

(58) Field of Classification Search
CPC .. G02B 6/3885; G02B 6/3887; G02B 6/3825; G02B 6/3821; G02B 6/36
See application file for complete search history.

(56) References Cited

U.S. PATENT DOCUMENTS

| | | |
|---|---|---|
| 5,212,752 A | 5/1993 | Stephenson et al. |
| 5,245,683 A | 9/1993 | Belenkiy et al. |
| 5,781,681 A | 7/1998 | Manning |
| 6,354,878 B1 * | 3/2002 | Kropa ................ H01R 13/5816 439/607.41 |
| 6,542,674 B1 | 4/2003 | Gimblet |
| 6,856,750 B2 | 2/2005 | Chang |
| 6,886,990 B2 | 5/2005 | Taira et al. |

(Continued)

FOREIGN PATENT DOCUMENTS

| | | |
|---|---|---|
| EP | 1443350 A2 | 8/2004 |
| JP | 5297246 A | 11/1993 |

OTHER PUBLICATIONS

International Search Report and Written Opinion PCT/US2017/037411 dated Sep. 25, 2017.

(Continued)

*Primary Examiner* — Jennifer Doan
(74) *Attorney, Agent, or Firm* — Michael E. Carroll, Jr.

(57) ABSTRACT

A tunable connector formed from a connector sub-assembly, a housing an an outer housing is disclosed. The connector sub-assembly has an inner housing, a ferrule held by a ferrule holder and a retention body. The housing is formed from two shells that define a longitudinal passageway that supports a portion of an optical fiber cable to define cable assembly. The longitudinal passageway has a front-end section that supports a section of the retention body to inhibit longitudinal movement but to allow for rotation of the retention body and thus the connector sub-assembly to a select orientation. An outer housing operably disposed over the inner housing inhibits rotation of the retention body and thus the connector sub-assembly once an orientation is selected. Connector and cable sub-assemblies and assemblies, as well as a method of tuning the tunable connector, are also disclosed.

38 Claims, 11 Drawing Sheets

(56) References Cited

U.S. PATENT DOCUMENTS

| | | | |
|---|---|---|---|
| 6,918,704 B2 * | 7/2005 | Marrs | G02B 6/3843 385/53 |
| 7,090,406 B2 | 8/2006 | Melton et al. | |
| 7,113,679 B2 | 9/2006 | Melton et al. | |
| 2002/0081077 A1 | 6/2002 | Nault | |
| 2002/0181893 A1 | 12/2002 | White et al. | |
| 2013/0266279 A1 | 10/2013 | Nishioka et al. | |
| 2014/0178006 A1 | 6/2014 | Dunn, Jr. et al. | |
| 2014/0241670 A1 | 8/2014 | Barnette, Jr. et al. | |
| 2015/0177097 A1 | 6/2015 | Clarke et al. | |
| 2016/0131851 A1 | 5/2016 | Theuerkorn | |
| 2016/0131852 A1 | 5/2016 | Theuerkorn | |

OTHER PUBLICATIONS

Data Pixel, "Koncentrik Measurement System, Application Notes—Fibre Optic Cable Assembly Tuning," 2 pages, "Admitted Art" http://www.data-pixel.com/wp-content/uploads/2012/01/Koncentrik.pdf.

U.S. Appl. No. 14/992,433, filed Jan. 11, 2016, "Fiber Optic Connector With Strain Relief Assembly," T. Theuerkorn.

U.S. Appl. No. 62/309,600, filed Mar. 17, 2016, "Tunable Optical Fiber Connector and Tuning Methods for Optical Fiber Cable Assemblies," J. Rosson.

* cited by examiner

TUNABLE OPTICAL FIBER CONNECTORS AND CONNECTOR AND CABLE SUB-ASSEMBLIES AND ASSEMBLIES

FIELD

The present disclosure relates to optical fiber connectors and cable assemblies, and in particular relates to tunable optical fiber connectors and connector and cable assemblies and sub-assemblies.

BACKGROUND

Optical fiber connectors ("connectors") are devices used to optically connect one optical fiber to another, or to connect an optical fiber to another device such as an optical transmitter or an optical receiver. An optical fiber cable typically carries the optical fiber. The connector and the optical fiber cable constitute an optical fiber cable assembly, or just "cable assembly" for short. The connector is typically formed by engaging an inner housing with an outer housing, wherein the inner housing supports a ferrule.

An important property of a connector is its ability to provide an efficient optical connection, i.e., an optical connection whereby the optical loss (also called "insertion loss") due to the connection is minimal. This efficiency is referred to in the art as the "coupling efficiency."

Certain types of connectors and connector assemblies are hardened to improve their performance in potentially harsh environments. Thus the term "hardened" describes a connector or receptacle port intended for making an environmentally sealed optical connection suitable for outdoor use. A "non-hardened" connector describes a connector or receptacle port that is not intended for making an environmentally sealed optical connection. Hardened connectors are typically used for FTTX and FTTH applications.

It is advantageous to "tune" the connectors and the cable assemblies in the factory to minimize optical loss in the field. The tuning process involves measuring the core-ferrule concentricity, i.e., the offset between the optical fiber core and the true center of the ferrule in which the optical fiber is supported. In one example, tuning a single fiber optical connector is usually performed by a contact method in which the connector being tuned is mated to a master connector whose fiber core position is known. The tuning can also be performed using other contact methods that do not involve making a connection to a master connector. In other examples, non-contact methods can be employed.

The contact methods that do not involve making a connection to a master connector and the non-contact methods typically require a substantial portion of the outer surface of the ferrule to be exposed. Because the inner housing in most connector designs covers substantially all (e.g., about 90%) of the ferrule length, these measurement methods normally require the core-ferrule concentricity to be measured without the inner housing in place. Accommodating such a requirement in cable assembly processes can add costs, complexities, and/or inefficiencies.

SUMMARY

An embodiment of the disclosure is a tunable cable sub-assembly that includes: a cable having at least one optical waveguide; a connector sub-assembly comprising an inner housing having an interior, a ferrule held by a ferrule holder that at least partially resides within the interior of the inner housing, and a retention body disposed adjacent the ferrule holder and having a first retention feature, and the the at least one optical waveguide attached to the ferrule; and a housing comprising two shells, the two shells defining a longitudinal passageway for a portion of the at least one optical waveguide to pass therethrough, the longitudinal passageway having a front-end section shaped to support a portion of the retention body and that includes a second retention feature that cooperates with the first retention feature of ferrule holder to inhibit longitudinal movement of the ferrule holder relative to the housing while allowing for rotation of the ferrule holder so that the ferrule is rotatable relative to the housing.

Another embodiment of the disclosure is a tunable cable assembly that includes the tunable cable sub-assembly described above, and an outer housing. The outer housing has an interior configured to receive the inner housing of the connector sub-assembly in one of at least four possible angular orientations of the inner housing. The outer housing engages the housing to inhibit rotation of the inner housing of the connector sub-assembly relative to the housing.

Another embodiment of the disclosure is a tunable cable assembly that includes: a cable having at least one optical fiber; a connector sub-assembly comprising an inner housing having an interior, a ferrule held by a ferrule holder that resides within the inner housing interior, and a retention body operably arranged adjacent the ferrule holder and comprising a first retention feature; a housing comprising two shells, the two shells defining a longitudinal passageway to pass a portion of the at least one optical fiber to the ferrule, the longitudinal passageway having a front-end section shaped to support a portion of the retention body to inhibit longitudinal movement of the retention body while allowing for rotation of the retention body for positioning the connector sub-assembly in one of at least four possible select angular orientations relative to the housing; and an outer housing having an interior configured to receive the inner housing of the connector sub-assembly in one of at least four possible select angular orientations of the inner housing, wherein the outer housing engages the housing to inhibit rotation of the inner housing of the connector sub-assembly relative to the housing.

Another embodiment of the disclosure is a housing assembly for a tunable cable assembly that includes a cable having at least one optical waveguide and a retention body having a crimp section. The housing assembly includes: first and second shells; a crimp band that holds together the first and second shells; the first and second shells each having half-pipe passages that define a longitudinal passageway configured to operably support a portion of the cable and to pass the at least one optical waveguide therethrough; and wherein the longitudinal passageway has a front-end section that closely supports the crimp section of the retention body, the front-end section having a first retention feature that cooperates with a second retention feature of the crimp section to inhibit longitudinal movement of the crimp section while allowing for rotation of the crimp section within the front-end section.

Another embodiment of the disclosure is a method of forming a tuned cable assembly using a connector sub-assembly having an inner housing and a ferrule supported by a retention body within the inner housing, a housing, and a cable having at least one optical fiber that includes a bare fiber section. The method includes: a) supporting the bare fiber section in a ferrule while disposing a crimp section of a retention body of the connector sub-assembly in a front-end section of the housing that is configured to allow the crimp section to rotate while inhibiting longitudinal movement of the crimp section; b) rotating the crimp section within the front-end section of the housing so that the inner housing has one of at least four possible select orientations relative to the housing, wherein the one select orientation is chosen to increase a coupling efficiency of the cable assembly (e.g., tune the connector); and: c) after act b), disposing an outer housing over the inner housing so that the outer housing engages the housing in a manner that inhibits rotation of the crimp section within the front-end section of the housing.

Another embodiment of the disclosure is a tunable connector for use with an optical fiber cable that supports at least one optical waveguide. The tunable connector includes: a connector sub-assembly that includes a central axis, an inner housing having an interior, a ferrule held by a ferrule holder that resides within the inner housing interior, and a retention body operably arranged adjacent the ferrule holder and having a crimp section that includes a first retention feature; a housing comprising two shells, the two shells defining a longitudinal passageway configured to operably support a portion of the optical fiber cable and to pass the at least one optical waveguide therethrough, the longitudinal passageway having a front-end section that closely supports the crimp section of the retention body and that includes a second retention feature that cooperates with the first retention feature to inhibit longitudinal movement of the crimp section while allowing for rotation of the crimp section so that the connector sub-assembly is rotatable to one of at least four possible select orientations relative to the housing; and an outer housing operably disposed over the inner housing and that engages the housing to inhibit rotation of the connector sub-assembly relative to the housing once the connector sub-assembly is placed in the one of the at least four select orientations.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

U.S. Provisional Patent Application No. 62/309,600, filed on Mar. 17, 2016, U.S. Pat. No. 7,090,406, U.S. Pat. No. 7,113,679, and U.S. Patent Application Publication No. 2014/0241670 are all incorporated by reference herein.

Optical Fiber Connector Sub-Assembly

Figure 1:
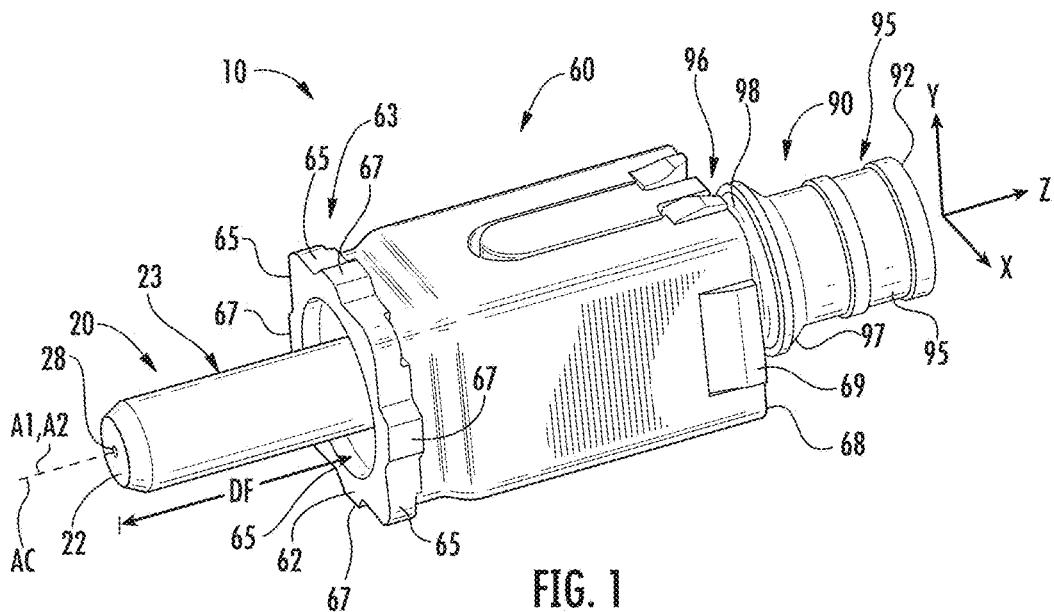
FIG. 1 is an isometric view of an example connector sub-assembly as disclosed herein.
Figure 2:
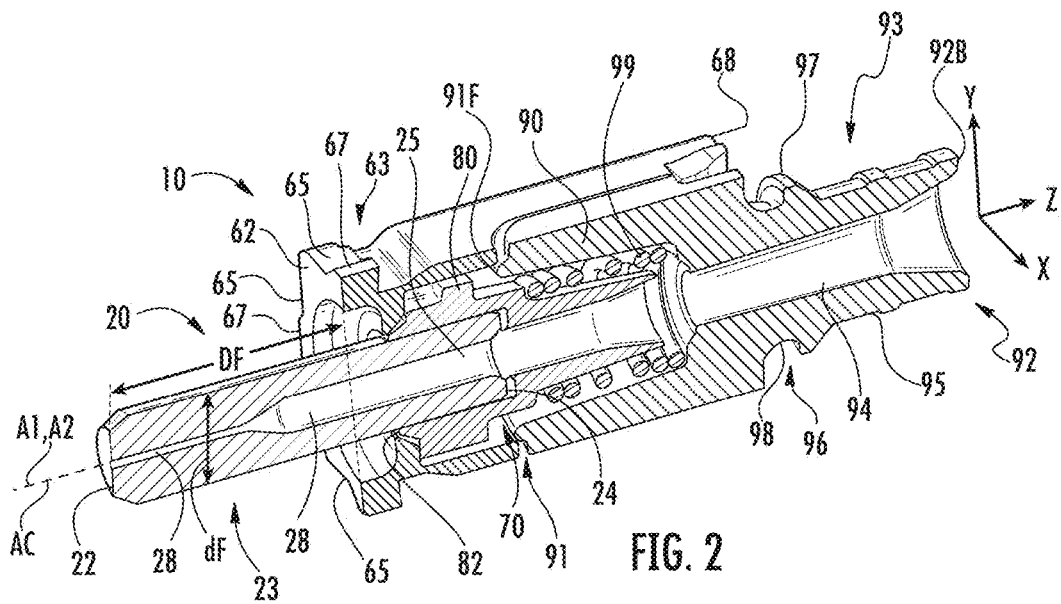
FIG. 2 is a cross-sectional view in the y-z plane of the connector sub-assembly of FIG. 1.
Figure 3:
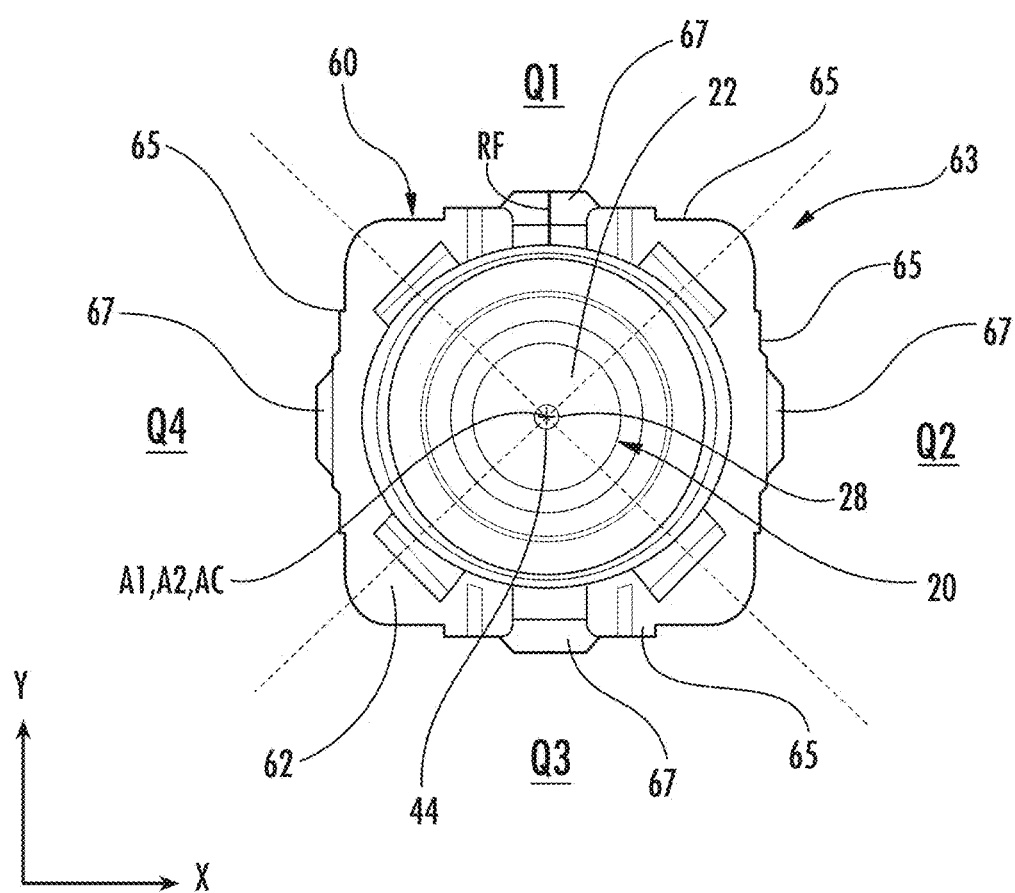
FIG. 3 is a front-on view of the cable sub-assembly of FIG. 1 and FIG. 2, illustrating the symmetry of the inner housing and how the cable sub-assembly can be divided into quadrants so that a measured core position of an optical fiber in the optical fiber cable can be assigned to one of the quadrants.

FIG. 1 is an isometric view and FIG. 2 is a central cross-sectional view (y-z plane) of an example optical fiber connector sub-assembly ("connector sub-assembly") 10 that operably supports a ferrule 20. FIG. 3 is a front-on view of the connector sub-assembly 10. Although the connector sub-assembly 10 is shown in the form of a sub-assembly for an SC-type optical connector, the principles described below may be applicable to different connector designs. The connector sub-assembly 10 has a central axis AC.

Figure 4:
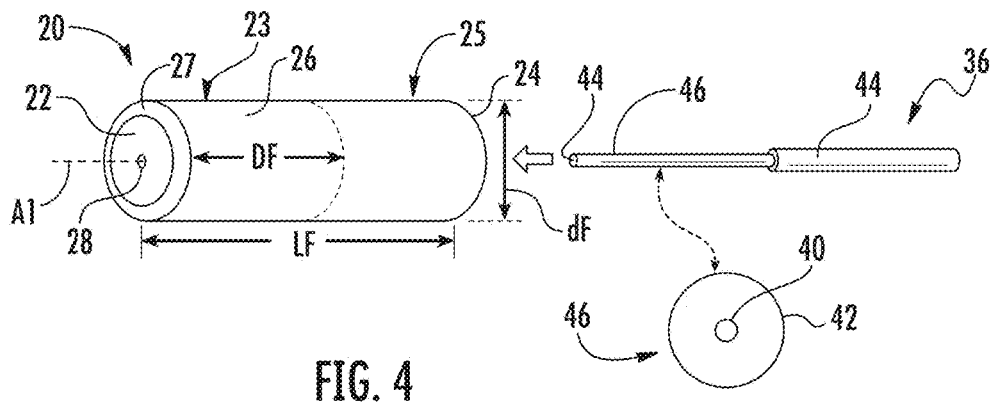
FIG. 4 is an isometric view of an example ferrule that is part of the connector sub-assembly of FIG. 1, and also shows how the bare fiber section of an optical fiber can be inserted into a bore of the ferrule.

FIG. 4 is an isometric view of an example ferrule 20. The ferrule 20 is substantially cylindrical and has a front end 22, a back end 24, an outer surface ("ferrule outer surface") 26, and a substantially central axial bore 28 that has a central axis A1. The ferrule 20 has a front-end section 23 adjacent front end 22 (front-end section 23 also defines front end 22), and a back-end section 25 adjacent back end 24 (back-end section 25 also defines back end 24). The ferrule 20 has an axial length LF between the front and back ends 22, 24 (e.g., measured along central axis A1) and a diameter dF in a plane perpendicular to central axis A1 (see FIG. 2).

The axial bore 28 is nominally centered on the true center of ferrule 20, i.e., to within a manufacturing tolerance, e.g., 1 micron (μm). In an example, ferrule 20 includes a beveled section 27 at the front end 22 adjacent ferrule outer surface 26. The beveled section 27 transitions from the diameter of the front end 22 to the diameter of the ferrule outer surface 26, which corresponds to dF. Axial bore 28 is sized to hold a bare optical fiber section (e.g., a fiber section having the one or more coatings removed), as described below.

With reference again to FIG. 1 through FIG. 3, connector sub-assembly 10 includes an inner housing (sometimes referred to as simply "housing" or "connector body") 60 having a front end 62, a back end 68, an interior 70, and a housing axis A2. The inner housing 60 has a substantially square cross-sectional shape in the embodiment shown. The back end 68 may include at least one retention member 69 if desired, whose function is described below. The inner housing 60 has a front-end section 63, which in an example is in the form of a flange that defines front end 62 and that also includes four sides 65, with each side including an alignment feature 67. The four alignment features 67 are each shown as protrusions, i.e., as male alignment features. In other embodiments, front-end section 63 may not be in the form of flange and/or may include a different number of sides.

In the example shown, front-end section 63 of inner housing 60 has a generally square cross-sectional shape and the symmetry of four sides 65 of the front-end section makes the inner housing 60 "quad" symmetric or "four-fold" symmetric about the housing axis A2. As discussed in greater detail below, inner housing 60 is configured by way of example to be received in an interior of an outer housing in one of four possible orientations corresponding to the four-fold symmetry. Other symmetries besides four-fold symmetry can also be employed. In an example, axes A1, A2 and AC are co-axial.

The interior 70 of inner housing 60 operably supports ferrule 20 so that front end 24 extends beyond a front end a front end 62 of the inner housing. For example, in the embodiment shown, interior 70 receives a ferrule holder 80 that resides along housing axis A2. Ferrule holder 80 has an open front end 82 that holds ferrule 20 at back-end section 25 so that front-end section 23 of ferrule 20 extends well beyond front end 62 of inner housing 60. Ferrule holder 80 is supported within a retention body 90 (also referred to as a crimp body or lead-in member in some embodiments) that engages inner housing 60 at the back end 68 and that extends into interior 70 of inner housing 60. Retention body 90 includes a front-end section 91 with a front end 91F and a back-end section 92 with a back end 92B. The back-end section 92 has a crimp section 93 that includes back end 92B. The retention body 92 also includes a central bore 94 and an outer surface 95. The crimp section 93 includes a retention feature 96, which is shown by way of example as a ring-shaped (circular) groove 98 in outer surface 95 and defined in part by a ring-shaped (circular) flange 97.

The connector sub-assembly 10 also includes a bias member in the form of a spring 99 that resides in the interior 70 of inner housing 60 and that surrounds a rear-end portion of ferrule holder 80. An epoxy or other bonding agent is used to hold bare fiber section 40 within bore 28 of ferrule 20 and/or to hold optical fiber 36 in place within ferrule holder 80. The front end 22 of ferrule 20 extends a distance DF from front end 62 of inner housing 60 (e.g., measured along central axis A1 or housing axis A2). The distance DF can also be considered as the axial length of front-end section 23 of ferrule 20.

The connector sub-assembly 10 is shown herein as being an SC type by way of example, but other types of connector sub-assemblies such as LC, FC, ST, MT, and MT-RJ are contemplated by the present disclosure.

Figure 5A:
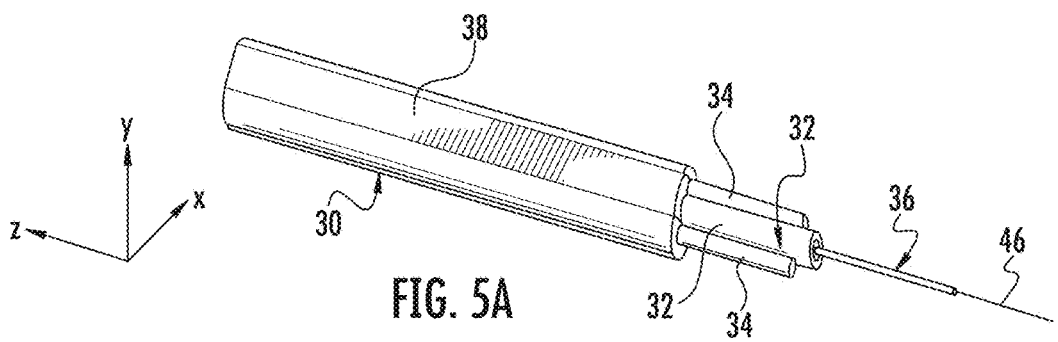
FIG. 5A is an elevated view and FIG. 5B is an x-y cross-sectional view of an example optical fiber cable that supports an optical component in the form of an optical fiber.
Figure 5B:
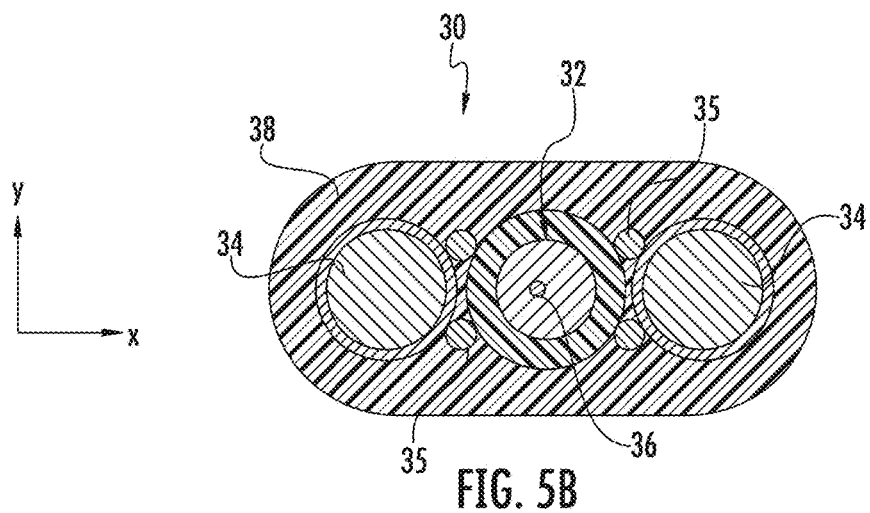

FIG. 5A is an elevated view of an example optical fiber cable ("cable") 30 while FIG. 5B is an x-y cross-sectional view of the cable of FIG. 3B. In this embodiment, cable 30 is a flat dielectric cable of the type described in U.S. Pat. No. 6,542,674, which is incorporated by reference herein. Other types of optical fiber cables can also be used in combination with a suitable configured housing, as explained below.

The cable 30 has an optical component 32, at least one strength component 34, and a jacket 38. In this case, strength component 34 has two glass-reinforced plastic (GRP) strength components and optical component 32 has at least one optical waveguide 36 disposed within a buffer tube 33. Cable 30 also includes at least one strength member 35 to provide additional tensile strength. In an example, optical waveguide 36 comprises an optical fiber having a core 40 surrounded by a cladding 42 which can be surrounded by a protective coating 44, as shown in the close-up inset of FIG. 4. The optical waveguide 36, when stripped of protective coating 44, defines a bare section 46. In the discussion below, optical waveguide 36 is referred to as optical fiber 36 and bare section 46 is referred to as bare fiber section 46 by way of non-limiting example.

As used herein, the term "strength component" means the strength element has anti-bucking strength, while the term "strength member" means a strength element lacks anti-buckling strength. Furthermore, the term "tensile element" means either a strength component or a strength member. Strength members 35 allow cable 30 to have a smaller cross-sectional footprint because they allow strength components 34 to have smaller diameters since they will not provide all of the tensile strength to cable 30. In other words, the tensile load is carried by both strength components 34 and strength members 35. Moreover, using strength members 35 maintains a relatively flexible outdoor cable that is easier to handle. Of course, other cables may be used with the concepts disclosed and other exemplary cables will be discussed herein. Moreover, suitable connector assemblies may be used with suitable cables according to the concepts disclosed herein, thereby resulting in numerous cable/connector combinations. For instance, suitable cables may be round designs that only have strength members or cables may be designs that only include strength components.

FIG. 5A shows cable 30 having strength members 35 (see FIG. 5B) cut flush with the stripped back jacket 38, thereby exposing the two GRP strength components 34 and bare fiber section 46 of optical component 32 from the end of cable 30. Axial bore 28 of ferrule 20 is sized to closely support bare fiber section 46.

Figure 6A:
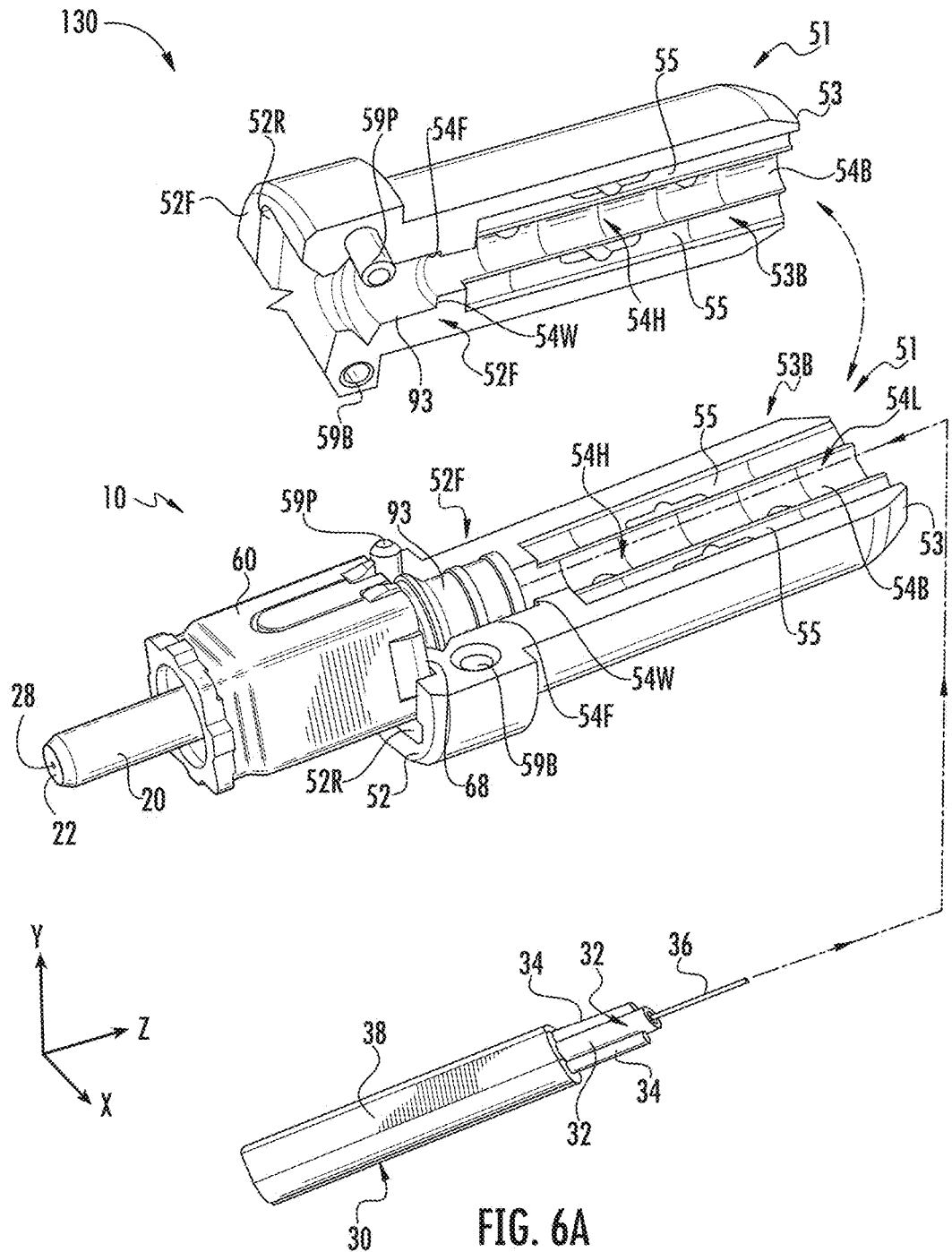
FIG. 6A is a partially exploded isometric view of an example hardened cable sub-assembly formed by the connector sub-assembly, the optical fiber cable and a housing having two shells.
Figure 6B:
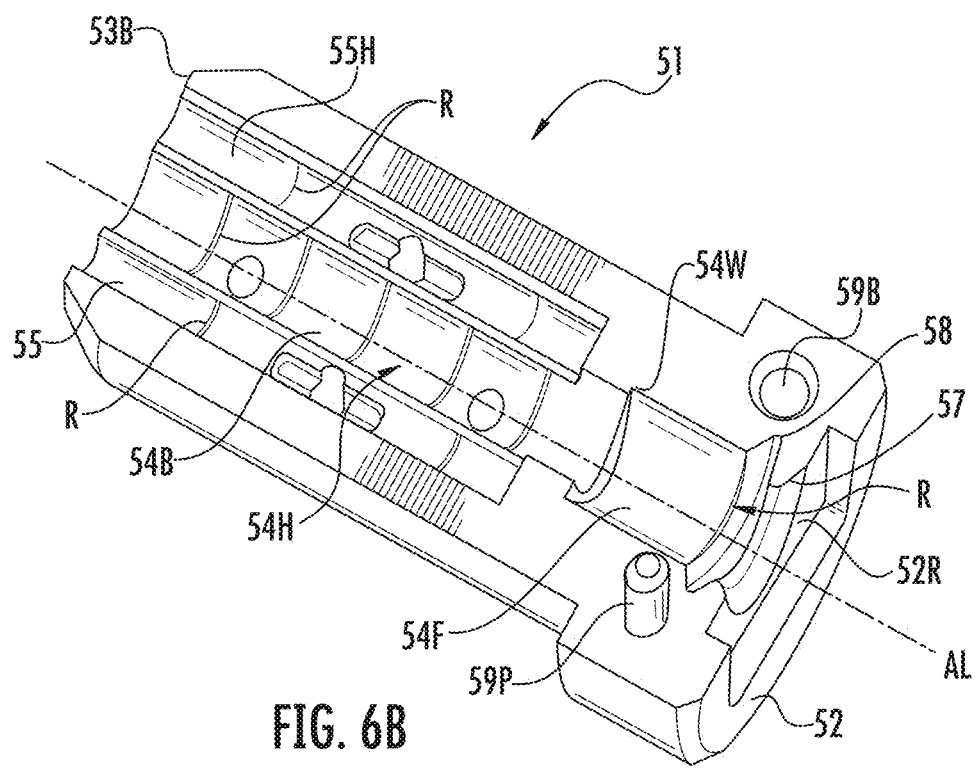
FIG. 6B is an elevated isometric view of an example of one of the two shells that make up the housing of FIG. 6A.

FIG. 6A is a partially exploded isometric view of an example cable sub-assembly 130 formed from connector sub-assembly 10, cable 30 and a housing 50, which in an example is formed by two shells 51. FIG. 6B is an elevated isometric view that shows the inner surface of an example shell 51. Only one shell 51 is illustrated since in the instant example two symmetrical shells 51 are used to form housing 50. In other examples, there may be a first shell and a second shell that are different. For instance, one shell may have two alignment pins, rather than each shell having a single alignment pin. In an example, housing 50 is held together by a crimp band CB and together define a housing assembly. In another example, the two shells 51 are held together using a securing material such as an adhesive or bonding agent.

As shown in FIG. 6B, shell 51 includes front-end section 52 with a front end 52F and a back-end section 53 with a back-end 53B. The front-end section 52 is configured to secure connector sub-assembly 10 while back-end section 53 is configured to secure cable 30 and to provide strain relief. A central half-pipe passageway 54H runs between first end 52F and back end 53B and through the front-end section 52 and back-end section 53 and has a longitudinal axis AL. The front end 52F includes a recess 52R that in an example is half of a rectangle, e.g., half of a square.

The back-end section 53 thus includes a back-end portion 54B of central half-pipe passageway 54H and two outboard half-pipe passageways 55H. The half-pipe passageways 54H and 55H can include at least one rib R that assists in retaining optical component 32 and strength components 34. Moreover, while half-pipe passageways 54H and 55H are sized for the particular components of the example flat cable 30, these passageways can be sized for different configurations of cable 30.

The front section 52 also includes a front-end portion 54F of central half-pipe passageway 54H. The front-end portion 54F of half-pipe passageway 54H at front-end section 52 is configured to accommodate crimp section 93 of retention body 90. The front-end portion 54F includes a wall section 54W that defines the rear extent of the front-end portion and that confronts (e.g., having surfaces that align when assembled) a portion of back end 92B of crimp section 93 of retention body 90 when the crimp section is disposed in the front-end portion.

Figure 6C:
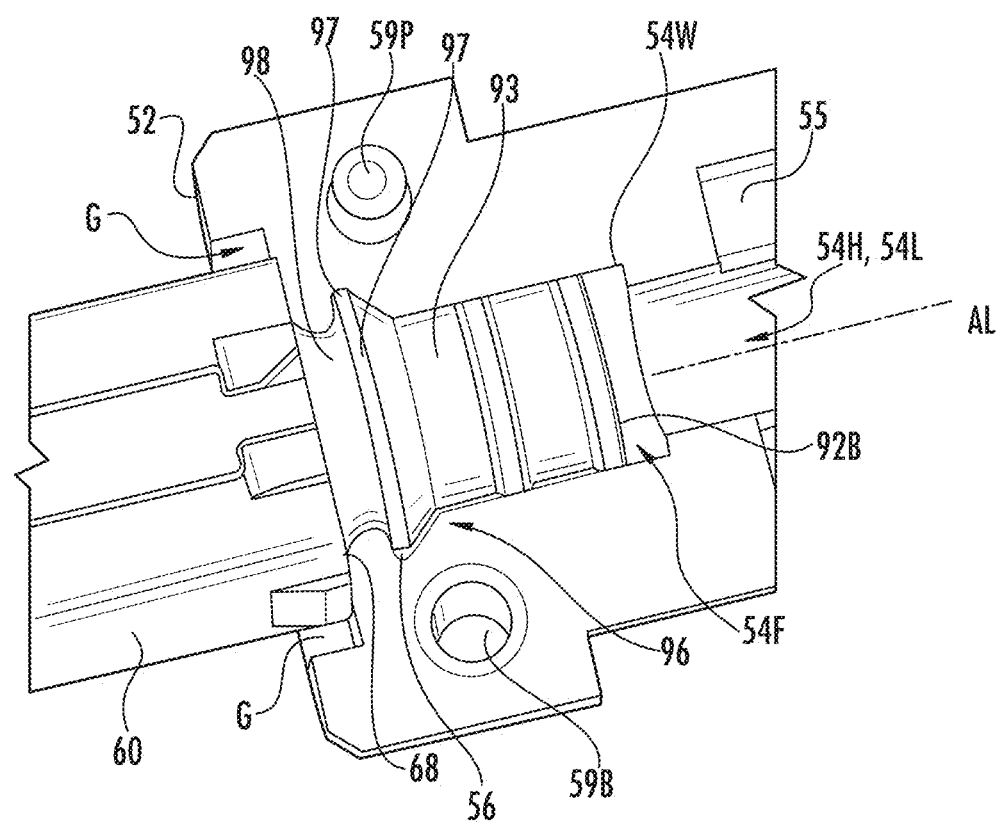
FIG. 6C is a close-up top-down view of the front-end section of one of the shells of the housing and showing the crimp section of the connector sub-assembly rotatably residing therein.

FIG. 6C is a close-up top-down view that shows crimp section 93 residing in front-end portion 54F of front section 52. The front-end section 52 includes alignment features in the form of an alignment pin 59P and an alignment bore 59B. The front-end portion 54F includes a retention feature 56 that cooperates with retention feature 96 of crimp section 93 of retention body 90. In an example, retention features 56 and 96 have complementary configurations. In the example shown, retention feature 56 includes a circular flange 57 that defines a circular groove 58 that closely receives circular flange 97.

Figure 6D:
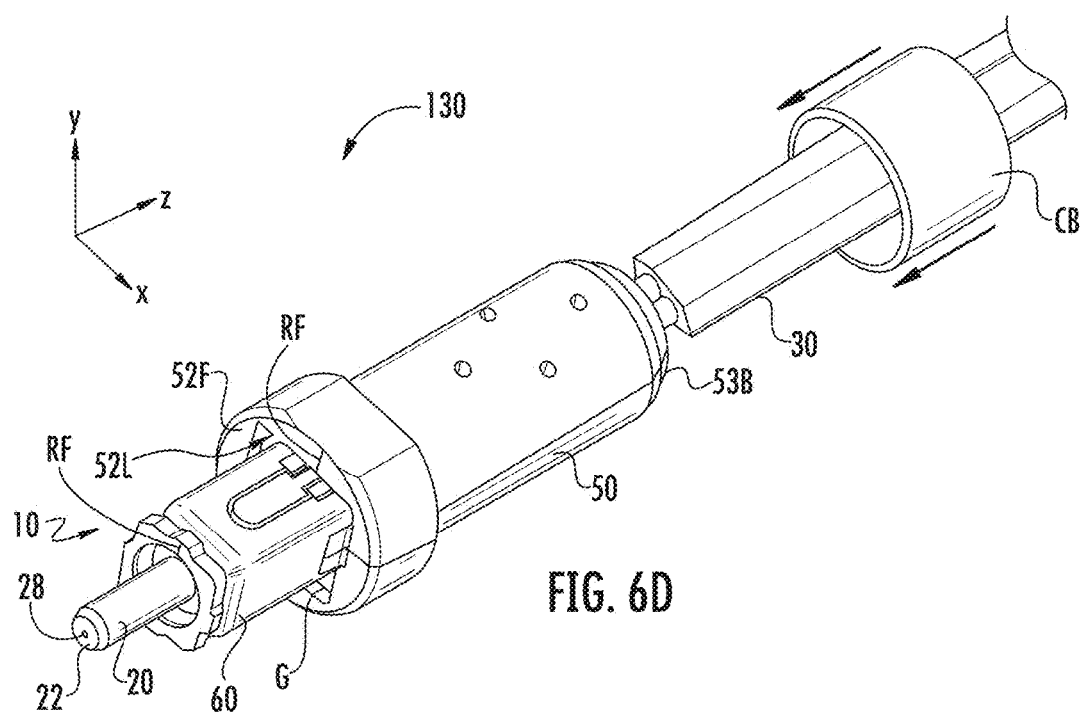
FIG. 6D is similar to FIG. 6B and shows the cable sub-assembly of FIG. 6A in the process of being assembled by operably disposing the crimp band over the housing.

FIG. 6D is similar to FIG. 6B and shows cable sub-assembly 130 of FIG. 6A in the process of being assembled by forming housing 50 by bringing together the two shells 51 about crimp section 93 and the portion of cable 30 residing therein. The alignment of the two shells 51 is accomplished by inserting pins 59P into complementary bores 59B of the two shells and results in the aforementioned configuration of the two shells. A crimp band CB is then installed over housing 50. FIG. 6D also shows an example wherein front end 52F of housing 50 includes a reference features RF in the form of a line that runs in the y-direction and that matches the reference feature on the front end 62 of inner housing 60.

The two half-pipe passageways 54H in the assembled housing 50 define a "full-pipe" passageway 54L having a longitudinal axis AL when the two shells 51 are combined to form the housing 50. Likewise, when the two shells 51 are combined, the two recess 52R combine to form a large recess 52L. In an example recesses 52R combine to form a square large recess 52L.

With reference again to FIG. 6C, large recess 52L is sized to accommodate the back end 68 of inner housing 60 with room to spare, thereby defining a gap G in the unfilled portion of the large recess.

Meanwhile, the complementary retention features 96 and 56 serve to axially (longitudinally) retain crimp section 93 within front-end portion 54F of the full-pipe passageway 54L while allowing the crimp section to rotate therein even when housing 50 is secured by crimp band CB. Thus, crimp section 93 rotatably resides within front-end portion 54F of passageway 54L and connector sub-assembly 10 is rotatable relative to housing 50 even though it is axially fixed with respect to the housing, i.e., cannot substantially move along the longitudinal axis AL of passageway 54L.

Figure 6E:
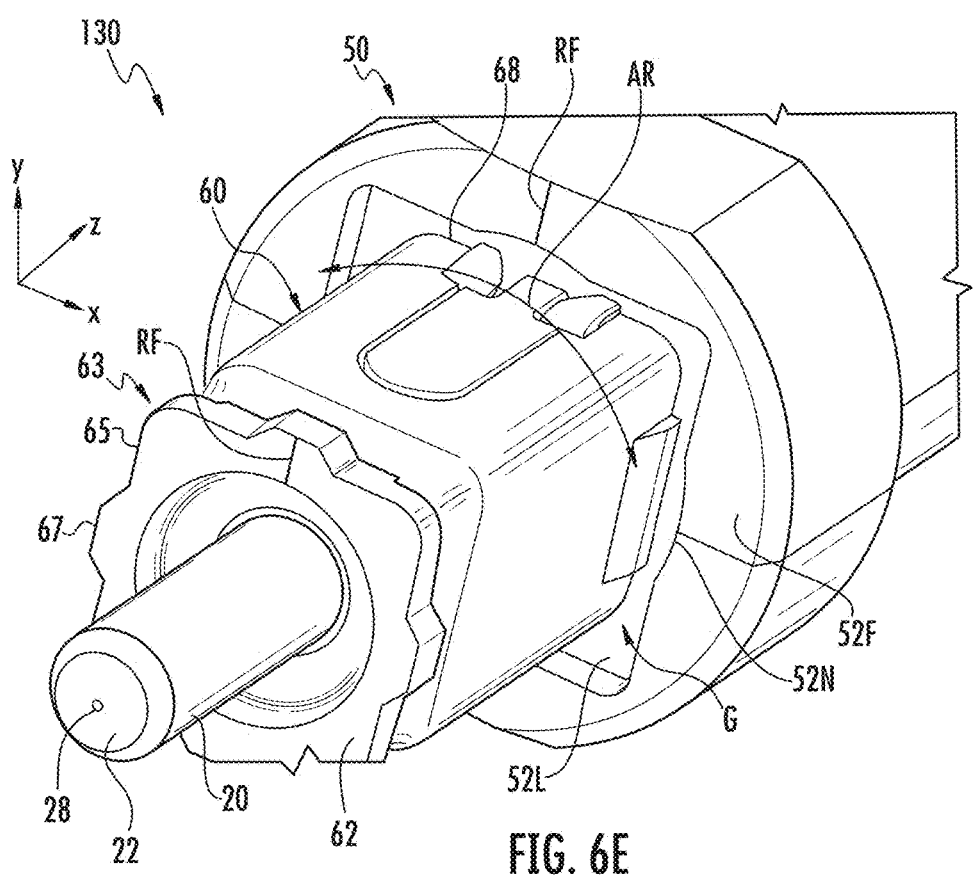
FIG. 6E is a close-up front-elevated view of the cable sub-assembly of FIG. 6D, showing how the back end of the inner housing resides within a rectangular recess at the front end of the housing.

FIG. 6E is a close-up front-elevated view of the cable sub-assembly 130, showing how the back end 68 of inner housing 60 resides within large recess 52L formed at the front end of housing 50 by the mated shells 51. In an example, rectangular recess 52R includes indentations 52I that allow for unimpeded rotation of inner housing 60 within the rectangular passageway. The rotation of connector sub-assembly 10 relative to housing 50 is shown by arrow AR. FIG. 6E also clearly shows the gap G formed by inner housing 60 residing within large recess 52L. FIG. 6E also shows an example wherein large recess 52L includes a notch 52N that facilitates the rotation of inner housing 50 within the large recess in the case where the large recess may otherwise inhibit rotation.

There area number of manufacturing errors that may result in core 40 of bare fiber section 46 being off-center with respect to a true center of ferrule 20. The degree to which core 40 and the true center of ferrule 20 are aligned is called the core-ferrule concentricity. Here, the term "concentricity" relates to the fact that the true ferrule center is typically measured with reference to ferrule outer surface 26.

The manufacturing errors that give rise to errors in the core-ferrule concentricity can include: (1) an offset of core 40 relative to cladding 42; (2) an offset of bare fiber section 40 within axial bore 28; and (3) an offset (non-centering) of axial bore 28 relative to the true ferrule center of ferrule 20 (again, based on ferrule outer surface 26). These errors tend to be random so that the precise location of core 40 relative to the true ferrule center in a given cable sub-assembly 110 is typically not known unless it is measured. An aspect of the connector tuning methods disclosed herein includes measuring the core-ferrule concentricity, such as disclosed in U.S. Patent Application Publication No. 2015/0177097 (the '097 Publication), which is incorporated by reference herein.

Note that front-end section 23 of ferrule 20 extends well beyond front end 62 of inner housing 60 by distance DF. In an example, the distance DF is between 25% and 50% of the total length LF of ferrule 20, while in another example, is between 35% and 50% of the total length LF (see FIG. 2).

In other words, in an example, 0.25·LF≤DF≤0.5·LF, while in another example 0.35·LF≤DF≤0.5·LF. In another example, distance DF is in the range dF≤DF≤4·dF. Thus, in such an example, when the diameter dF of ferrule 20 is 2.5 mm, the distance DF may be between 2.5 mm and 10 mm.

This relatively large distance DF provides access to ferrule outer surface 26 so that an accurate measurement of the core-ferrule concentricity can be made, as described below. The position (location) of core 40 relative to the true center of ferrule 20 can be identified relative to some reference on inner housing 60, e.g., relative to a reference feature RF, which in an example can be in the form of a line or like marking that runs in the y-direction ("twelve o'clock"), as shown in FIG. 3

The front elevation view of FIG. 3 of connector sub-assembly 110 illustrates an example of how a measurement of core-ferrule concentricity can establish the location of core 40 to be within one of four quadrants Q of inner housing 60, namely quadrants Q1, Q2, Q3 and Q4, with each quadrant spanning an angular range of 90 degrees.

As noted above, connector sub-assembly 10 is axially stationary but rotatable within housing 50 so that core 40 of bare-fiber section 46 can be selectively orientated to increase or optimize coupling efficiency.

Figure 7A:
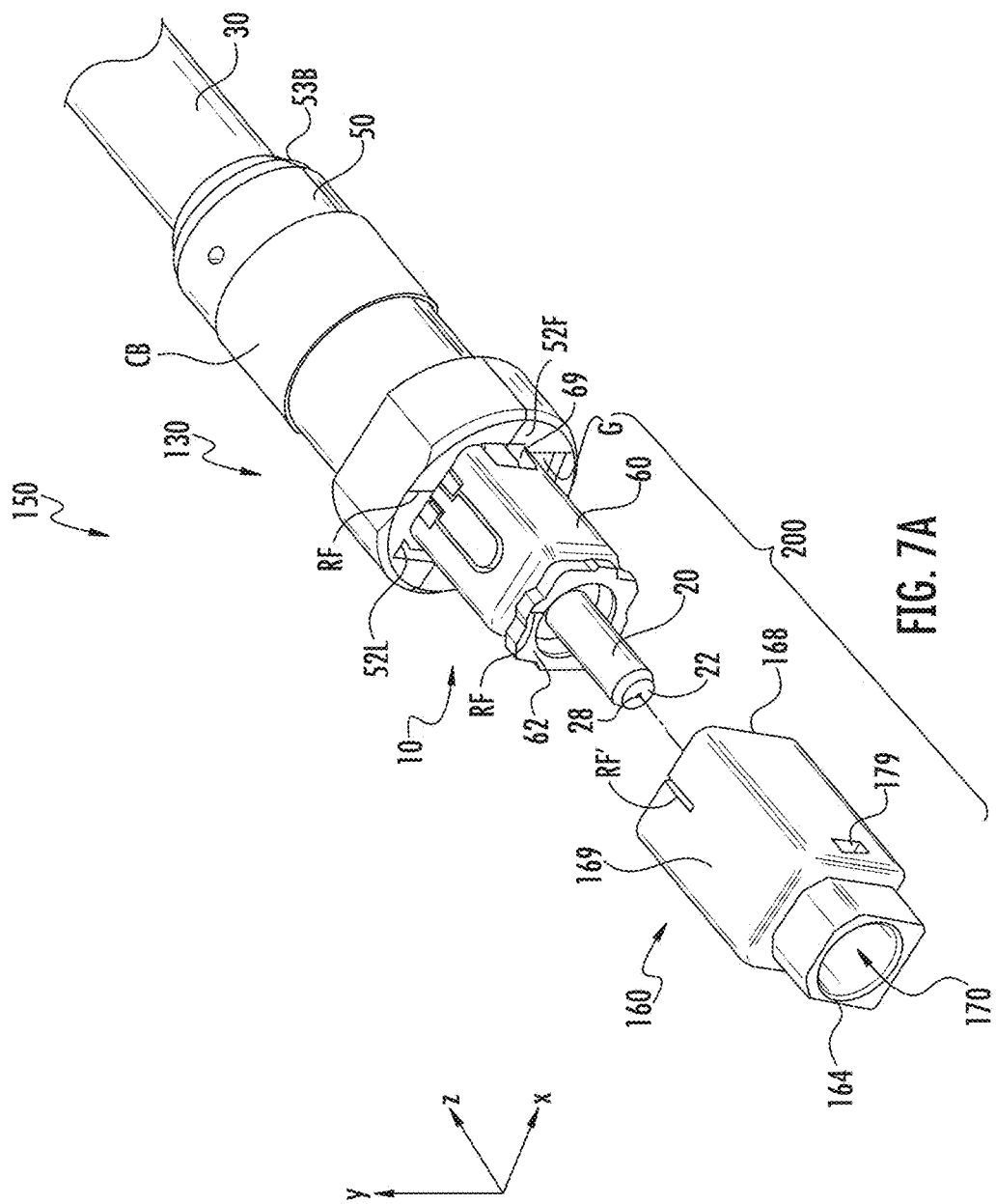
FIG. 7A is a partially exploded isometric view of an example cable assembly in the process of being formed by adding an outer housing to the inner housing of the connector sub-assembly after the connector sub-assembly has been selectively oriented with respect to the housing to improve the coupling efficiency.
Figure 7B:
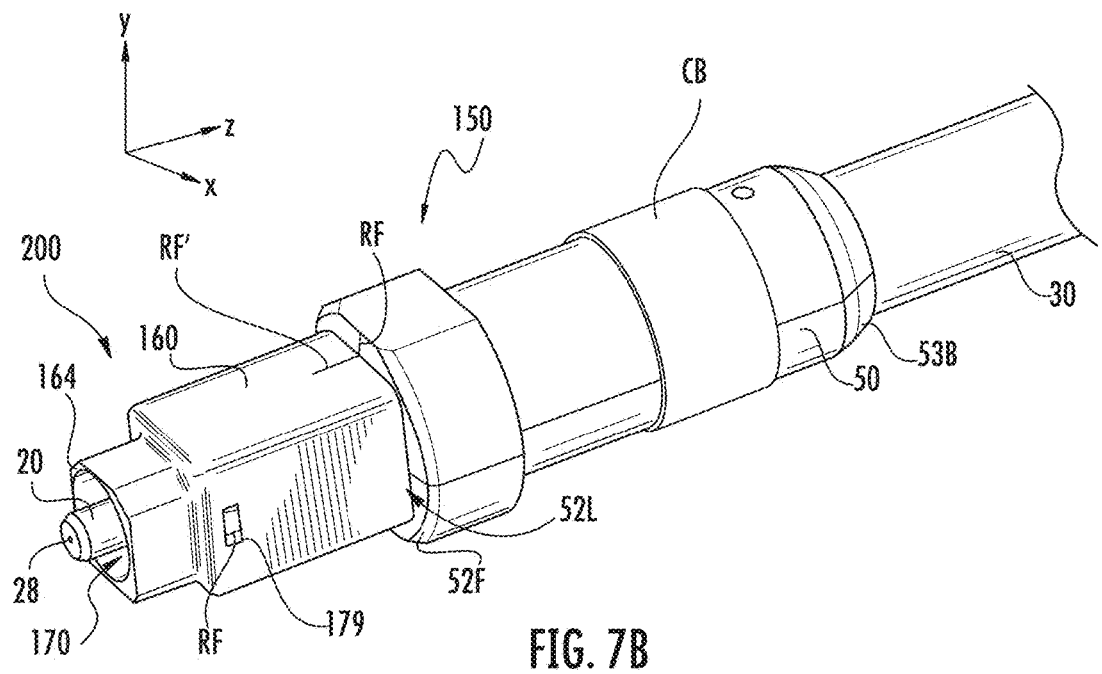
FIG. 7B is an isometric view of the assembled cable assembly.

FIG. 7A is a partially exploded isometric view of a cable assembly 150 formed by operably disposing an outer housing 160 on inner housing 60 of cable sub-assembly 130. The combination of outer housing 160 and connector sub-assembly 10 and housing 50 define a tunable connector 200 on cable assembly 150. Thus, the cable assembly 150 can be considered as a tunable cable assembly by virtue of tunable connector 200. FIG. 7B is a front elevation view of outer housing 160 operably disposed on inner housing 60 when the inner and outer housings are operably engaged to define connector 200, with the back end 168 of outer housing closely residing within rectangular recess 52R in gap G such that connector sub-assembly 10 can no longer rotate with respect to housing 50.

Figure 7C:
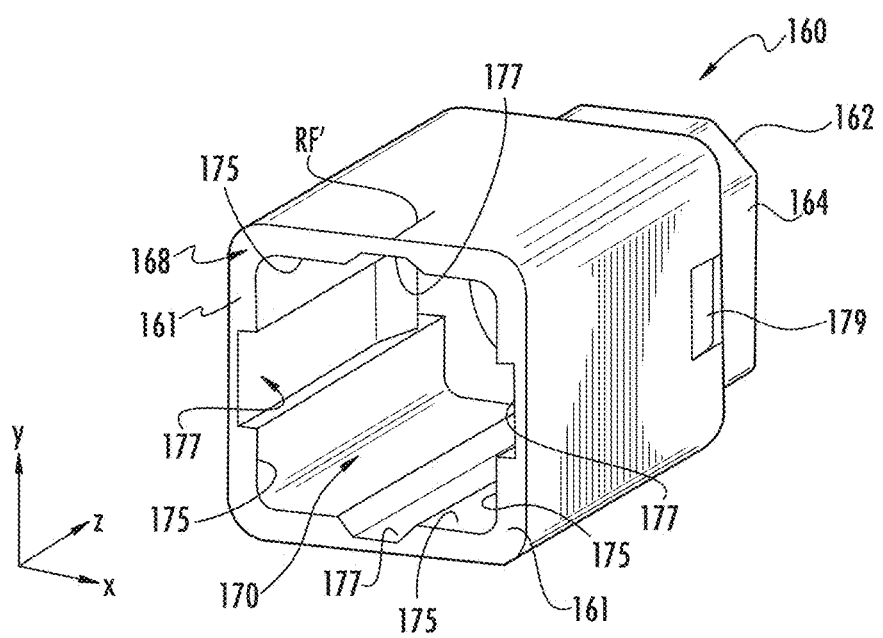
FIG. 7C is a back-end view of the outer housing used to form the cable assembly of FIGS. 7A and 7B.

FIG. 7C is a back-end view of outer housing 160. With reference to FIG. 7A through FIG. 7C, outer housing 160 includes side walls 161, front end section 162 with a front end 164 and a back-end section 166 with a back end 168. The outer housing 160 includes an outer surface 169 an interior 170. The interior 170 is defined by inner walls 175. In an example, interior 170 is defined by four inner walls 175 of side walls 168. The four inner walls 175 define a substantially square cross-sectional shape of the interior. The inner walls 175 respectively include alignment features 177 that are complementary to alignment features 67 on inner housing 60. Thus, in an example, alignment features 177 are recesses sized to receive and closely engage the protrusions that define alignment features 67. This quad-symmetric configuration of inner walls 175 of interior 170 allows inner housing 60 to be closely received and engaged in interior 170 of outer housing 160 in one of four possible orientations. A retention opening 179 in outer surface 169 of outer housing 160 is configured to receive and engage retention member 67 of inner housing 60 when the inner housing is inserted into interior 170 of outer housing 160. The side walls 161 have a thickness at back end 168 that is substantially the same as that of gap G so that the back end of the outer housing is closely received in the gap G formed by large recess 52L and inner housing 60.

In an example, outer housing 160 engages inner housing 60 of cable sub-assembly 110 in an orientation that provides the best optical coupling (i.e., tuning for the highest coupling efficiency or the lowest insertion loss) for the resulting cable assembly 150. Thus, as discussed above, prior to installing outer housing 160 on inner housing 60 to form connector 200, it can be first determined in which quadrant Q core 40 resides. This involves a measurement of the core-to-ferrule concentricity. Because outer housing 160 can be installed on inner housing 60 in a select orientation in forming connector 200, connector 200 is also considered to be tunable.

Measuring the Core-to-Ferrule Concentricity

As noted above, connector sub-assembly 10 and the cable assembly 110 formed from the connector sub-assembly each provides access to the ferrule outer surface 26 to allow for measurements of location of core 40 to be made relative to the true ferrule center, i.e., to measure the core-ferrule concentricity. In an example, measurement of the core-ferrule concentricity is made using a non-contact core-ferrule concentricity measurement system such as disclosed in aforementioned U.S. '097 Publication. It is noted that such non-contact measurements are made with increasing accuracy if more of ferrule outer surface 26 is exposed because the distance sensors can be used to measure the ferrule outer surface at more that one axial location.

In another example, the core-ferrule concentricity is measured using a contact method that does not utilize a master connector (i.e., a reference connector) to establish an optical connection. In an example of such a method, ferrule 20 of cable sub-assembly 110 is disposed on a ball array measurement system.

Figure 8A:
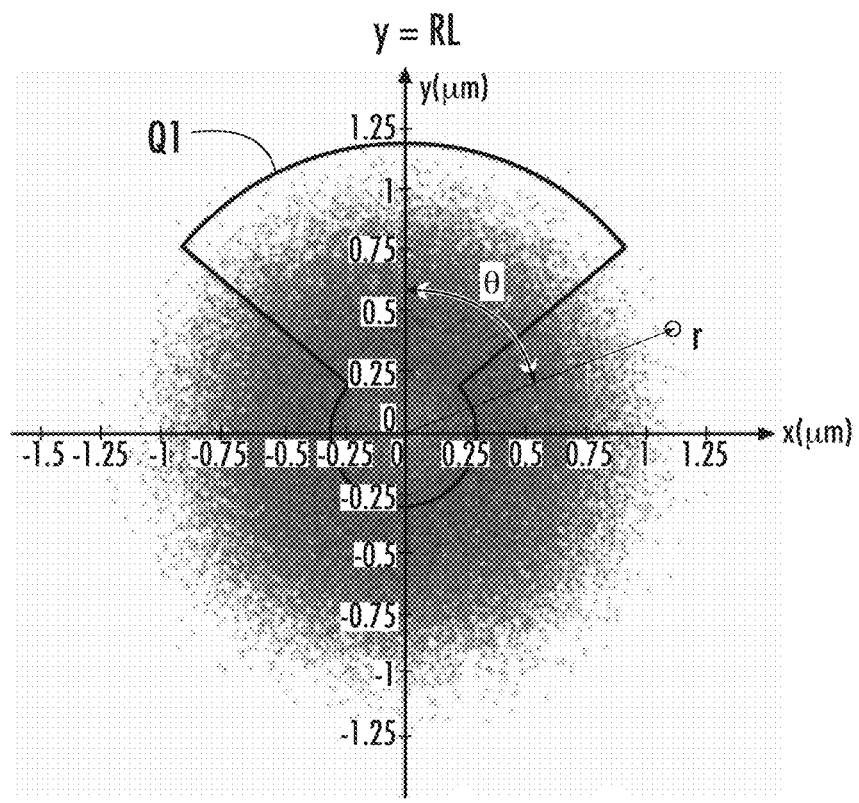
FIG. 8A is a scatter plot of core-ferrule concentricity based on Monte Carlo simulations, illustrating a substantially uniform distribution of core-ferrule concentricity measurements with angle (i.e., about the z-axis), and showing an example first quadrant Q1.

FIG. 8A is a scatter plot of the core-to-ferrule concentricity. The points in the scatter plot have (r, θ) coordinates, wherein r coordinate is the magnitude of the core offset measured relative to the ferrule center, while the θ coordinate shows the angular direction of the offset relative to a reference line RL. Cartesian x and y axes are also shown, with the units in microns (μm). The first quadrant Q1 is shown in the plot for reference.

The data points in the plot were created using a Monte-Carlo simulation of core-ferrule concentricity based on three major sources of error: a core/cladding offset in the optical fiber; an offset of the bare fiber section within the axial bore; and an offset of the axial bore relative to the true ferrule center. The plot shows a relatively uniform distribution of the data with angular coordinate θ. As can be seen from the plot of FIG. 8A, the position of core 40 will fall into one of the four quadrants Q associated with inner housing 60.

Thus, once the location of core 40 in a given quadrant Q is determined, the question becomes what orientation should outer housing 160 have relative to inner housing 60 in order to tune the resulting connector 200, i.e., to increase or maximize the coupling efficiency or to reduce or minimize the insertion loss of the resulting cable assembly 150. If the orientation of outer housing 160 relative to the inner housing 60 is made random when forming a set of cable assemblies 150, the coupling efficiency between any two pairs of the cable assemblies in the set will vary over a relatively large range. As can be seen in the plot of FIG. 8A, this is because the core locations can range from being in the same quadrant, which results in a relatively high coupling efficiency, to being in opposite quadrants that results in a relatively low coupling efficiency.

Thus, in order to maximize the coupling efficiency for a set of cable assemblies 150, each cable assembly has a tuned configuration whereby inner housing 60 and outer housing 160 are operably engaged in a select orientation so that the quadrant Q in which core 40 is located is in the same position relative to the outer housing. This can be accomplished for example by noting the position of a reference feature RF' on outer housing 160 relative to corresponding reference feature RF on inner housing 60. In an example, the reference features RF and RF' can be keying features, alignment features or indicia.

An embodiment of the disclosure includes a method of forming tuned cable assembly 150 using connector sub-assembly 10. The method includes supporting bare fiber section 46 in ferrule 20 while disposing crimp section 93 of retention body 90 of the connector sub-assembly in a front-end section 52 of housing 50 that is configured to allow the crimp section to rotate while inhibiting longitudinal movement of the crimp section. The method also includes rotating the crimp section 93 within the front-end section 52 of housing 50 so that the inner housing 60 has one of at least four possible select orientations relative to the housing, wherein the one select orientation is chosen to increase a coupling efficiency of the cable assembly 150. The method also includes disposing outer housing 160 over inner housing 60 so that the outer housing engages housing 50 in a manner that inhibits rotation of the crimp section within the front-end section 52 of the housing.

Figure 8B:
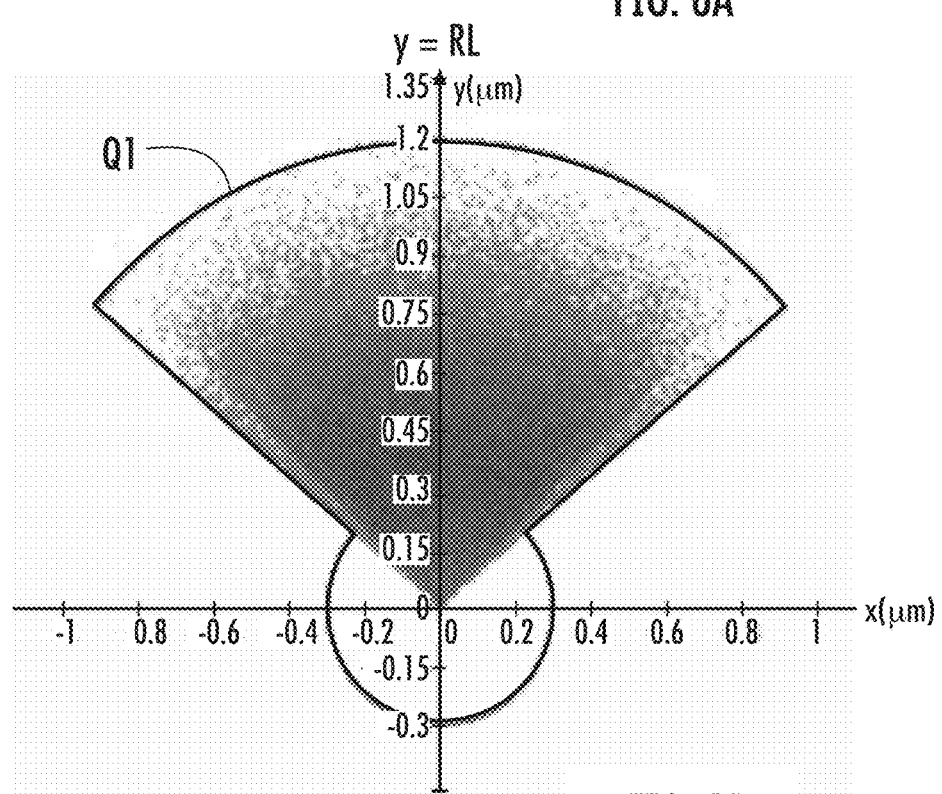
FIG. 8B is a scatter plot of the core-ferrule concentricity for tuned optical fiber connectors, wherein the outer housing is oriented with respect to the inner housing of each optical fiber connector so that the core locations of the respective optical fibers are all located in the first quadrant.

This tuning method gives rise to the scatter plot of FIG. 8B, wherein all of the locations of core 40 can be considered to effectively reside in a single quadrant Q, e.g., quadrant Q1 as shown. This means that for any pair of cable assemblies 150, the optical connection established between respective connectors 200 will have a greater coupling efficiency on average than in the case where inner and outer housings 60 and 160 are engaged without regard to the core location, i.e., in a non-tuned configuration. This is because the core locations, on average, will be closer together in the tuned configuration as compared to the non-tuned configuration.

It will be apparent to those skilled in the art that various modifications to the embodiments of the disclosure as described herein can be made without departing from the spirit or scope of the disclosure as defined in the appended claims. For example, in alternative embodiments, inner housing 60 may have more than four-fold symmetry about the housing axis A2, and outer housing 160 may be configured to receive and engage inner housing 60 in more than four possible orientations such as six or eight possible orientations. Alternatively or additionally, sides 65 of inner housing 60 and interior 170 of outer housing 170 may be configured to provide the different orientations without complementary alignment features. The sides 65 also need not be substantially identical in some embodiments. Indeed, outer housing 160 may even be configured to receive inner housing 60 in different orientations without there being symmetry of the inner housing about housing axis A2.

As can be appreciated, the disclosure covers the modifications and variations provided they come within the scope of the appended claims and the equivalents thereto.

What is claimed is:

1. A tunable cable sub-assembly, comprising:
a cable having at least one optical waveguide;
a connector sub-assembly comprising an inner housing having an interior, a ferrule held by a ferrule holder that at least partially resides within the interior of the inner housing, and a retention body disposed adjacent the ferrule holder and having a first retention feature, wherein the at least one optical waveguide is attached to the ferrule; and
a housing comprising two shells, the two shells defining a longitudinal passageway for a portion of the at least one optical waveguide to pass therethrough, the longitudinal passageway having a front-end section shaped to support a portion of the retention body and that includes a second retention feature having a shape complementary with the first retention feature of the retention body and that cooperates with the first retention feature of the retention body to inhibit longitudinal movement of the ferrule holder relative to the housing while allowing for rotation of the ferrule holder so that the ferrule is rotatable relative to the housing.

2. The tunable cable sub-assembly according to claim 1, wherein the first retention feature includes a circular flange and the second retention feature includes a circular groove that receives the circular flange and allows rotation of the ferrule holder relative to the housing.

3. The tunable cable sub-assembly according to claim 1, wherein the first retention feature includes a circular groove and the second retention feature includes a circular flange that is received within the circular groove and allows rotation of the ferrule holder relative to the housing.

4. The tunable cable sub-assembly according to claim 1, wherein the two shells are secured to one another using a crimp band.

5. The tunable cable sub-assembly according to claim 1, wherein the housing comprises a front recess and wherein a back end of the inner housing resides within the front recess.

6. A tunable cable assembly, comprising:
the tunable cable sub-assembly of claim 1; and
an outer housing having an interior configured to receive the inner housing of the connector sub-assembly in one of at least four possible angular orientations of the inner housing, wherein the outer housing engages the housing to inhibit rotation of the inner housing of the connector sub-assembly relative to the housing.

7. The tunable cable assembly according to claim 6, wherein each shell includes a front end with a recess formed therein and that combine to form a single large recess sized to receive a back end of an inner housing to define a gap that closely receives a back end of the outer housing to inhibit the rotation of the connector sub-assembly relative to the housing.

8. The tunable cable assembly according to claim 6, wherein the inner housing has a front-end section comprising at least four sides configured to cooperate with the interior of the outer housing to define the at least four possible orientations.

9. The tunable cable assembly according to claim 6, wherein the at least four sides of the inner housing render the front-end section of the inner housing at least four-fold symmetric relative to a central axis of the inner housing.

10. The tunable cable assembly according to claim 6, wherein the inner and outer housings comprise complementary retention members that act to retain the inner housing within the interior of the outer housing.

11. The tunable cable assembly according to claim 6, wherein the outer housing and the inner housing respectively comprise first and second reference features that indicate the select angular orientation of the outer housing relative to the inner housing.

12. A tunable cable assembly, comprising:
a cable having at least one optical fiber;
a connector sub-assembly comprising an inner housing having an interior, a ferrule held by a ferrule holder that resides within the inner housing interior, and a retention body operably arranged adjacent the ferrule holder and comprising a first retention feature;
a housing comprising two shells, the two shells defining a longitudinal passageway to pass a portion of the at least one optical fiber to the ferrule, the longitudinal passageway having a front-end section shaped to support a portion of the retention body and comprising a second retention feature having a shape that is complementary to the first retention feature of the retention body to inhibit longitudinal movement of the retention body while allowing for rotation of the retention body for positioning the connector sub-assembly in one of at least four possible select angular orientations relative to the housing; and an outer housing having an interior configured to receive the inner housing of the connector sub-assembly in one of at least four possible select angular orientations of the inner housing, wherein the outer housing engages the housing to inhibit rotation of the inner housing of the connector sub-assembly relative to the housing.

13. The tunable cable assembly according to claim 12, wherein the housing includes a front end having a recess, the outer housing includes a back end, and wherein the back end of the outer housing closely resides within the recess.

14. The tunable cable assembly according to claim 12, wherein each shell includes a front end with a recess formed therein and that combine to form a single large recess sized to receive a back end of an inner housing to define a gap that closely receives a back end of the outer housing.

15. The tunable cable assembly according to claim 12, wherein the inner housing has a front-end section having at least four sides configured to cooperate with the interior of the outer housing to define the at least four possible orientations of the inner housing relative to the outer housing.

16. The tunable cable assembly according to claim 15, wherein the at least four sides of the inner housing render the front-end section of the inner housing at least four-fold symmetric relative to a central axis of the inner housing.

17. The tunable cable assembly according to claim 12, wherein the inner and outer housings include complementary retention members that act to retain the inner housing within the interior of the outer housing.

18. The tunable cable assembly according to claim 12, wherein the outer housing and the inner housing respectively include first and second reference features that indicate the select orientation of the outer housing relative to the inner housing.

19. The tunable cable assembly according to claim 12, wherein the cable includes at least one strength component.

20. A housing assembly for a tunable cable assembly that includes a cable having at least one optical waveguide and a retention body having a crimp section, the housing assembly comprising:

first and second shells;
a crimp band that holds together the first and second shells;
the first and second shells each having half-pipe passages that define a longitudinal passageway configured to operably support a portion of the cable and to pass the at least one optical waveguide therethrough; and
wherein the longitudinal passageway has a front-end section that closely supports the crimp section of the retention body, the front-end section having a first retention feature that cooperates with a second retention feature of the crimp section to inhibit longitudinal movement of the crimp section while allowing for rotation of the crimp section within the front-end section.

21. The housing assembly according to claim 20, wherein the first retention feature and the second retention feature are complementary.

22. The housing assembly according to claim 20, wherein:
a) the first retention feature includes a flange and the second retention feature includes a groove sized to closely receive the flange; or
b) the second retention feature includes a flange and the first retention feature includes a groove sized to closely receive the flange.

23. The housing assembly according claim 20, wherein the first and second retention features each include a groove and a flange.

24. The housing assembly according to claim 20, wherein each shell includes a front end with a recess formed therein and that combine to form a single large recess sized to receive a back end of an inner housing to define a gap that closely receives a back end of an outer housing in which the inner housing resides.

25. A method of forming a tuned cable assembly, the method comprising:
a) providing a cable having at least one optical waveguide comprising at least one optical fiber that includes a bare fiber section;
b) providing a connector sub-assembly comprising (1) an inner housing having an interior, (2) a ferrule held by a ferrule holder that at least partially resides within the interior of the inner housing, and (3) a retention body disposed adjacent the ferrule holder and having a first retention feature, wherein the at least one optical waveguide is attached to the ferrule;
c) providing a housing comprising two shells, the two shells defining a longitudinal passageway for a portion of the at least one optical waveguide to pass therethrough, the longitudinal passageway having a front-end section shaped to support a portion of the retention body and that includes a second retention feature having a shape complementary with the first retention feature of the retention body and that cooperates with the first retention feature of the retention body to inhibit longitudinal movement of the ferrule holder relative to the housing while allowing for rotation of the ferrule holder so that the ferrule is rotatable relative to the housing;
d) supporting the bare fiber section in the ferrule while disposing a crimp section of the retention body of the connector sub-assembly in a front-end section of the housing;
e) rotating the crimp section within the front-end section of the housing so that the inner housing has one of at least four possible select orientations relative to the housing, wherein the one select orientation is chosen to increase a coupling efficiency of the cable assembly; and
f) after act e), disposing an outer housing over the inner housing so that the outer housing engages the housing in a manner that inhibits rotation of the crimp section within the front-end section of the housing.

26. The method according to claim 25, wherein the crimp section includes the first retention feature, the front-end section of the housing includes the second retention feature, and wherein act f) further comprises rotating the first retention feature with respect to the second retention feature.

27. The method according to claim 25, wherein the at least one optical fiber is a single optical fiber.

28. The method according to claim 25, wherein the at least one optical fiber has a core and wherein the act e) further comprises performing a non-contact a core-ferrule concentricity measurement.

29. The method according to claim 25, wherein the housing has a front end and wherein in act f), the outer housing closely engages a recess in the front end of the housing.

30. The method according to claim 25, wherein the housing is formed from two shells configured to support an optical fiber cable that carries the at least one optical fiber.

31. The method according to claim 30, wherein the two shells are secured to one another using a crimp band.

32. A tunable connector for use with an optical fiber cable that supports at least one optical waveguide, comprising:
a connector sub-assembly that includes a central axis, an inner housing having an interior, a ferrule held by a ferrule holder that resides within the inner housing interior, and a retention body operably arranged adjacent the ferrule holder and having a crimp section that includes a first retention feature;
a housing comprising two shells, the two shells defining a longitudinal passageway configured to operably support a portion of the optical fiber cable and to pass the at least one optical waveguide therethrough, the longitudinal passageway having a front-end section that closely supports the crimp section of the retention body and that includes a second retention feature that cooperates with the first retention feature to inhibit longitudinal movement of the crimp section while allowing for rotation of the crimp section so that the connector sub-assembly is rotatable to one of at least four possible select orientations relative to the housing; and
an outer housing operably disposed over the inner housing and that engages the housing to inhibit rotation of the connector sub-assembly relative to the housing once the connector sub-assembly is placed in the one of the at least four select orientations.

33. The tunable connector according to claim 32, wherein the housing has a front end that includes a recess, wherein the inner housing resides within the recess to form a gap, and wherein the outer housing has an end that closely resides within the gap.

34. The tunable connector according to claim 32, wherein the shells are secured to each other by a securing material.

35. The tunable connector according to claim 32, wherein the shells are secured to each other by a crimp band.

36. The tunable connector according to claim 32, wherein the first and second retention features respectively comprise either a circular groove and a circular flange or a circular flange and a circular groove.

37. The tunable connector according to claim 32, wherein the inner housing has a front-end section having at least four sides that render the front-end section at least four-fold symmetric relative to a central axis of the inner housing.

38. The tunable cable sub-assembly of claim 1, wherein the inner housing is rotatable with respect to the housing and the first retention feature comprises one of a circular flange or circular groove and the second retention feature comprises the other of the circular flange or the circular groove.

* * * * *

UNITED STATES PATENT AND TRADEMARK OFFICE
CERTIFICATE OF CORRECTION

PATENT NO. : 10,067,299 B2  
APPLICATION NO. : 15/196818  
DATED : September 4, 2018  
INVENTOR(S) : Joel Christopher Rosson et al.

Page 1 of 1

It is certified that error appears in the above-identified patent and that said Letters Patent is hereby corrected as shown below:

On the Title Page

In Column 2, item (57), Abstract, Line 2, delete "an an" and insert -- an --, therefor.

In the Claims

In Column 14, Line 8, Claim 23, delete "according claim" and insert -- according to claim --, therefor.

Signed and Sealed this  
Twenty-ninth Day of December, 2020

Andrei Iancu  
*Director of the United States Patent and Trademark Office*